(12) United States Patent
Benveniste

(10) Patent No.: US 6,940,845 B2
(45) Date of Patent: Sep. 6, 2005

(54) ASYMMETRIC MEASUREMENT-BASED DYNAMIC PACKET ASSIGNMENT SYSTEM AND METHOD FOR WIRELESS DATA SERVICES

(75) Inventor: Mathilde Benveniste, South Orange, NJ (US)

(73) Assignee: AT & T, Corp., Bedminster, NJ (US)

( * ) Notice: Subject to any disclaimer, the term of this patent is extended or adjusted under 35 U.S.C. 154(b) by 770 days.

(21) Appl. No.: 09/813,794

(22) Filed: Mar. 22, 2001

(65) Prior Publication Data

US 2001/0055297 A1 Dec. 27, 2001

Related U.S. Application Data

(60) Provisional application No. 60/191,500, filed on Mar. 23, 2000.

(51) Int. Cl.[7] .................................................. H04J 3/24
(52) U.S. Cl. ...................................... 370/349; 370/389
(58) Field of Search .............................. 455/452.2, 62, 455/450, 451, 453, 464, 561, 65, 524, 69, 455, 456.2, 456.6, 452.1; 370/349, 389, 345, 247, 251, 277, 208, 203, 204, 206, 328, 343, 491, 500, 74, 98, 431, 321, 319, 329, 337, 344, 347, 280, 281, 294, 295; 375/144, 260

(56) References Cited

U.S. PATENT DOCUMENTS

| | | |
|---|---|---|
| 5,404,574 A | 4/1995 | Benveniste |
| 5,809,423 A | 9/1998 | Benveniste |
| 5,828,662 A * | 10/1998 | Jalali et al. .................. 370/335 |
| 6,052,594 A * | 4/2000 | Chuang et al. .............. 455/450 |
| 6,259,724 B1 * | 7/2001 | Esmailzadeh ................ 375/143 |
| 2001/0055297 A1 * | 12/2001 | Benveniste .................. 370/349 |
| 2002/0145968 A1 * | 10/2002 | Zhang et al. ................ 370/206 |

OTHER PUBLICATIONS

"Channel Assignment Schemes for Cellular Mobile Telecommunications Systems: A Comprehensive Survey", I. Katzela and M. Naghshineh, IEEE Personal Communications, Jun. 1996, pp. 1–29.
"Distributed Packet Dynamic Resource Allocation (DRA) for Wireless Networks", J.F. Witehead, Proc. of VTC '96, pp. 111–115.
"Dynamic Packet Assignment for Advanced Internet Cellular Services", J.C. Chuang and N. R. Sollenberger, Proc. of Globecom '97, pp. 1596–1600.
"Advanced Cellular Internet Service (ACIS)", L.J. Cimini, Jr., J.C. Chuang, and N.R. Sollenberger, IEEE Communications Magazine, Oct. 1998, pp. 150–159.
F. Furuya and Y. Akaiwa, "Channel segregation, a distributed adaptive channel allocation scheme for mobile communications systems", Trans. IEICE, vol. E74, Jun. 1991, pp. 1531–1537.

* cited by examiner

*Primary Examiner*—Wellington Chin
*Assistant Examiner*—Jamal A. Fox

(57) ABSTRACT

A method and system for assigning downlink and uplink channels to a mobile station registered with a base station, which uses an interference-sensing scheme and which provides improved reliability and performance over conventional schemes.

22 Claims, 11 Drawing Sheets

ASYMMETRIC MEASUREMENT-BASED DYNAMIC PACKET ASSIGNMENT SYSTEM AND METHOD FOR WIRELESS DATA SERVICES

Benefit is hereby claimed under 35 USC 119(e) of the U.S. Provisional Application filed Mar. 23, 2000 and assigned Ser. No. 60/191,500.

FIELD OF THE INVENTION

The invention disclosed is related to measurement-based dynamic packet assignment for wireless data services.

RELATED ART

This application is related to U.S. Pat. No. 5,404,574 to M. Benveniste, for "Apparatus and Method for Non-Regular Channel Assignment in Wireless Communication Networks," and to U.S. Pat. No. 5,809,423 for "Adaptive-Dynamic Channel Assignment Organization System and Method."

BACKGROUND OF THE INVENTION

The increased popularity of personal mobile communication and of portable computing will significantly increase the demand for wireless communication capacity, since they are heavy users of e-mail and web-browsing applications. Access through fixed wireless communication will also contribute to this demand growth. Voice calls will increase the circuit-switched traffic loads that have dominated wireless communication up until now. The emerging convergence of voice and data traffic into a single flow of IP packets will generate an ever-increasing packet-switched traffic load. Resource utilization efficiency is key to preserving the dynamic multiplexing advantages achievable from this convergence. Regardless of its origin, the increased demand will require more efficient methods of utilizing the RF spectrum allocated for this purpose.

Digital multiple access techniques must be optimized in order to meet the growing demand for wireless communication capacity. The concern here is with digital "channelized" methods, such as the North American time division multiple access (TDMA)/frequency division multiple access (FDMA) system defined by the IS-136 digital cellular standard or the European TDMA/FDMA system defined by the Groupe Speciale Mobile (GSM) digital cellular standard. A channel in a TDMA/FDMA system is a time-slot. The objective in maximizing traffic-carrying capacity is to assign a channel to the unit of traffic load in a way that maximizes the system's throughput without violating quality-of-service (QoS) requirements. This is true whether it is a circuit-switched call that has exclusive use of the circuit or a packet-switched call that shares the circuit with other calls.

New algorithms must be devised the meet an array of different quality-of-service (QoS) requirements that arise with packet-switched traffic from diverse applications. Though the QoS requirements can differ between different traffic types, their common objective and environmental/engineering constraints permit the use of similar channel assignment concepts for both. This is because the assignment of channels to a packet in a packet-switched network resembles the assignment of a channel to a call for its duration in a circuit-switched network. To underscore this similarity, the terms packet and call are used interchangeably herein.

The notion of applying circuit-switched channel assignment concepts to packet-switched traffic should be pursued with care as there exist fundamental differences. An important consideration relates to the asymmetry of the assignment in the two communication directions, the uplink direction from the mobile to the base station and the downlink direction from the base station to the mobile. With circuit-switched voice traffic, the uplink and downlink channels are paired, and channel assignment can thus utilize information available on only one direction. With packet-switched traffic, uplink and downlink channels would be typically independently assigned. A reason is the imbalance of the traffic loads in the two directions: there is more traffic on the downlink than on the uplink for certain applications, such as web browsing. But, even if the loads were balanced, channel assignment should occur independently in the two directions because of the non-coincidence of uplink and downlink packets, even when occurring during the same session.

Uncoupling the channel assignment for the two communication directions affects the applicability of circuit-switched traffic algorithms to packet-switched traffic. An important consideration relates to channel assignment algorithms relying on interference-sensing, known also as measurement-based algorithms. The problem to be addressed is how to perform asymmetric measurement-based channel assignment on a single direction.

Another consideration in packet-switched channel assignment is the packet length. Short "calls" require that the time dedicated to channel assignment be short in order to avoid capacity loss. To carry out channel assignment efficiently in a multi-cell environment, the multiple base stations must be synchronized. With packets of constant length, or of a small-integer multiple of a fixed length, channel selection by different base stations will occur simultaneously. In that case the possibility of contention for the same channel becomes likely.

I. Measurement Based Dynamic Channel Assignment (DCA)

There are two general forms of flexible channel assignment: adaptive, dynamic, and their combination known as adaptive-dynamic. See for example "Channel Assignment Schemes for Cellular Mobile Telecommunication Systems: A Comprehensive Survey", I. Katzela and M. Naghshineh, IEEE Personal Communications, June 1996. Also see the above referenced U.S. Pat. No. 5,404,574 and U.S. Pat. No. 5,809,423. Adaptive channel assignment (ACA) is a time-variable fixed channel assignment (FCA), whereby the set of channels allocated for use by a base station is fixed over a time interval, typically longer than the call duration. Dynamic channel assignment (DCA) also involves allocated sets of channels, whose membership may vary in time. The difference between the two is that the channel sets in ACA do not overlap and, more importantly, all allocated channels can be used simultaneously without violating the pre-specified quality-of-service target. With DCA, on the other hand, this requirement on the composition of channel sets is not observed. In fact, a common DCA approach employs channel sets comprising all the available channels. Consequently, before a channel is assigned to a call by DCA, a test is required to establish observance of the QoS requirement. The channel-assignment admissibility (channel assignment admissibility (CAA) criteria employed in this test vary.

The channel assignment admissibility (CAA) criterion may rely either on real-time channel utilization information shared across neighboring base stations and combined with knowledge of the interference relationships between base stations, or on real-time interference sensing. Dynamic channel assignment (DCA) algorithms employing the latter criterion are referred to as measurement-based algorithms. Such algorithms are particularly attractive for distributed system architectures as they require no real-time information sharing between base stations on channel utilization.

A. Measurement-Based Channel Assignment Admissibility (CAA) Criterion

A measurement-based channel assignment admissibility (CAA) criterion delivers the target quality of service only if the utilized measurements can predict reliably whether the channel assignment under consideration will violate the quality-of-service requirement. Many of the proposed measurement-based dynamic channel assignment (DCA) algorithms fail to do so. The IS 136 digital cellular system uses the mobile stations to measure the signals from surrounding base stations and report those measurements back to the serving base station. This is primarily used for mobile assisted handoff so that the network can decide whether a handoff is required. For channel assignment in an IS 136 digital cellular system, the quality-of-service requirement will not be met when the serving base station selects a channel for an incoming voice call by relying exclusively on measurements of the signal strength on downlink channels. Such measurements for channel assignment are called Mobile-Assisted Channel Assignment (MACA) measurements.

This situation is shown in FIG. 1, which depicts an indoor cellular system and an outdoor cellular system, respectively. In FIG. 1, mobile station 101 (MS1) is registered on base station 102 (BS1) and mobile station 103 (MS2) is registered on base station 104 (BS2). In FIG. 2, mobile station 201 (MS1) is registered on base station 202 (BS1) and mobile station 203 (MS2) is registered on base station 204 (BS2). The indoor system employs omni-directional base stations (with full-aperture transmitters and receivers) housed within a building whose walls, or other obstructions, may attenuate the transmitted signal. The outdoor system employs base stations with directional transmitters and receivers that limit the coverage angle. In both systems, mobiles have omni-directional receivers and transmitters. The common feature in the two systems is that a downlink signal from BS2 102 or 202 is hardly perceptible by mobile MS1 101 or 201 because of the location of the two. An obstruction attenuates the signal in the indoor system, and the mobile lies outside the beamwidth of the directional antenna of base station BS2 in the outdoor system.

Suppose that Mobile MS2 103 or 203 is engaged in a call. Suppose also that a call is initiated by mobile MS1 101 or 201 and that the list of channels sent to mobile MS1 101 or 201 by base station B1 102 or 202 for MACA measurement includes the channel used by mobile MS2. Because of its location, the signal measured by mobile MS1 101 or 201 on the channel used by mobile MS2 103 or 203 will be sufficiently weak to lead to the assignment of that channel to the incoming call. This assignment will cause interference to mobile MS2 103 or 203, and hence violate the quality-of-service requirement, because the CAA criterion used was inadequate. In general, a CAA criterion that relies on mobile measurements alone to sense interference will be inadequate.

A measurement-based channel assignment admissibility (CAA) criterion would meet the QoS requirement if measurement of the interference potential of a channel assignment is made on the exact same path to be traversed by the signals resulting from the assignment. In general, two types of measurements are needed in order to clear a channel for assignment. A measurement clearing the path between the mobile and the neighboring base stations, and another between the serving base station and the mobiles served by neighboring base stations. Clearance of channels can be accomplished differently depending on whether uplink and downlink channels are paired or not.

II. Coupled Uplink and Downlink Channel Assignment

Channel assignment in circuit-switched wireless networks occurs in pre-defined pairs of uplink and downlink channels. Such circuit-switched wireless networks are typically used to carry voice traffic. In such systems a measurement-based channel assignment admissibility (CAA) criterion could rely on a single signal strength measurement for both channels of the pair. See for example "Distributed Packet Dynamic Resource Allocation (DRA) for Wireless Networks", J. F. Whitehead, Proc. of VTC '96, pp 111–115. That is, both the base station and the mobile are engaged in measurement of the signal strength of a candidate pair of channels. The mobile's measurement clears the downlink channel and its associated uplink channel along all paths between the mobile and the neighboring base stations. The base station's measurement clears the uplink channel and its associated downlink channel along the path between the serving base station and the mobiles served by neighboring base stations.

It can be seen in FIGS. 1 and 2 that the coupled measurements would provide the indication of the interference potential for the channel pair. As explained earlier, a signal strength measurement by mobile MS1 101 or 201 alone indicates that there is no call on the downlink channel used by mobile MS2 103 or 203 because the obstruction attenuates the signal in the indoor system, and the mobile lies outside the beam-width of the directional antenna of base station BS2. If, in addition to mobile MS1 101 or 201 measuring the signal strength on the downlink channel used in mobile MS2's 103 or 203 call, base station BS1 102 or 202 also measured the signal strength on the paired uplink channel, there would be the indication that the pair of channels was used by a neighboring base station and hence the assignment would not be made.

III. Directionally-Uncoupled Channel Assignment

Unlike in circuit-switched wireless systems, channel assignment in packet-switched wireless systems requires uncoupling along the uplink and downlink communication directions, as the traffic in the two directions is non-coincident. That is, packets from the mobile and the base station occur at different times. Thus uncoupling would be required even if the traffic loads in the two directions were reasonably balanced.

In theory, both frequency-division and time-division duplex can support uncoupled channel assignment between uplink and downlink. Time-division duplex allows more efficient channel training, and allocation of the radio resource between the two directions requires no planning. With frequency-division duplex, a different number of channels would be made available in the two directions when the traffic loads along the two directions differ. Additionally, the duration of the measurement and channel selection must be short for, if it is significant relative to the duration of a call, it would cause capacity loss.

The problem of accommodating unbalanced packet traffic loads by applying a measurement-based channel assignment algorithm on a single direction has been addressed in "An OFDM-Based High-Speed-Data (HSD) Air Interface Proposal", J. C. Juang and S. Timuri, AWS submission to the Universal Wireless Communications Consortium UWCC GTF HSD/97.10.0709, Nov. 11, 1997. See also "Dynamic Packet Assignment for Advanced Internet Cellular Services", J. C. Chuang and N. R. Sollenberger, Proc. Of Globecom '97. See also "Advanced Cellular Internet Service (ACIS)", L. J. Cimini, Jr., J. C. Chuang, and N. R. Sollenberger, IEEE Communications Magazine, October 1998. A time division multiple access (TDMA)/frequency division multiple access (FDMA) frame structure was proposed for downlink packet assignment, which was based on the Orthogonal Frequency Division Multiplexing (OFDM) technique for multi-carrier modulation. Pilot tones that correspond to the downlink traffic channels in use are transmitted simultaneously by the base stations, thus enabling the mobiles to scan the pilots and complete channel assignment quickly. Mobiles with pending packets measure the tones transmitted by the neighboring base stations and report the list of interference-free channels to their serving base stations. The serving base station then notifies the mobiles of the channel assigned to transmit the traffic packet. By staggering the time of channel selection, the possibility of contention for the same channel by different base stations is avoided, which would be caused by the concurrency of channel assignment among base stations. Interfering base stations do not engage in channel assignment at the same time.

While the above-described scheme satisfactorily addresses the issue of measurement delay and contention, it does not always lead to interference-free channel assignments. Interference can result because the path traversed by the signal from the serving base station to the mobiles served by neighbor base stations, is not the same as the path traversed by the signal transmitted by a neighbor base station and sensed by the mobile during the interference measurement. As illustrated in FIGS. 1 and 2, there could be instances whereby mobile MS1 101 or 201 which is served by base station BS1, does not receive the pilot tones from a neighboring base station, base station BS2, even though the pilot is transmitted. This could be due to an obstruction, or simply to the orientation of a directional antenna. Hence, if base station BS1 selects the channel corresponding to the missed pilot tone, it could cause interference to mobile MS2 103 or 203, which is served by base station BS2.

Thus, a need arises for an interference-sensing scheme for use in asymmetric channel assignment which provides improved reliability and performance over conventional schemes.

SUMMARY OF THE INVENTION

The present invention is a method and system for assigning downlink and uplink channels to a mobile station registered with a base station. The present invention uses an interference-sensing scheme for use in asymmetric channel assignment which provides improved reliability and performance over conventional schemes.

One embodiment of the present invention is a method of assigning a downlink channel to a mobile station registered with a base station. Pilot tones being transmitted by a plurality of active mobile stations registered with the base station are turned off. Each turned off pilot tone corresponds to an assigned downlink channel. The mobile station is paged from the base station with a pending traffic packet. Interference sensing is performed at the base station to identify interference-free downlink channels. A downlink traffic channel is assigned at the base station to the mobile station to receive the pending packets and the downlink channel assignment is transmitted from the base station to the mobile station. The downlink channels may be assigned to a plurality of mobile stations registered with the base station. There may be a plurality of base stations and the method may be performed successively for each of the plurality of base stations.

Another embodiment of the present invention is a method of assigning an uplink channel to a mobile station registered with a base station. Pilot tones being transmitted by the base station are turned off. Each turned off pilot tones corresponds to an uplink channel assigned to one of a plurality of active mobile stations registered with the base station. The mobile station requests access for a traffic packet. Interference sensing is performed at the plurality of active mobile stations to identify interference-free uplink channels. A list of uplink channels identified as being acceptably interference-free is transmitted from each one of the plurality of active mobile stations. An uplink channel is assigned to the mobile station by the base station and the uplink channel assignment is transmitted from the base station to the mobile station. The uplink channels may be assigned to a plurality of mobile stations registered with the base station. There may be a plurality of base stations and the method may be performed successively for each of the plurality of base stations.

Another embodiment of the present invention is a method of assigning an uplink channel and a downlink channel to a mobile station registered with a base station. Pilot tones being transmitted by a plurality of active mobile stations registered with the base station are turned off. Each turned off pilot tone corresponds to an assigned downlink channel. Pilot tones being transmitted by the base station are turned off. Each turned off pilot tones corresponds to an uplink channel assigned to one of a plurality of active mobile stations registered with the base station. The mobile station is paged from the base station with a pending traffic packet. The mobile station requests access for a traffic packet. Interference sensing is performed at the base station to identify interference-free downlink channels. Interference sensing is performed at the plurality of active mobile stations to identify interference-free uplink channels. A list of uplink channels identified as being acceptably interference-free is transmitted from each one of the plurality of active mobile stations. A downlink traffic channel is assigned at the base station to the mobile station to receive the pending packets. An uplink channel is assigned to the mobile station at the base station. The downlink channel assignment and the uplink channel are transmitted from the base station to the mobile station. The downlink channels and uplink channels may be assigned to a plurality of mobile stations registered with the base station. There may be a plurality of base stations and the method may be performed successively for each of the plurality of base stations.

The resulting invention provides a reliable measurement-based channel assignment admissibility (CAA) system and method which is applicable to unidirectional uplink or downlink channel assignment.

DESCRIPTION OF THE DRAWINGS

The present invention will be more fully appreciated by referring to the accompanying drawings.

DISCUSSION OF THE PREFERRED EMBODIMENTS

Figure 1:
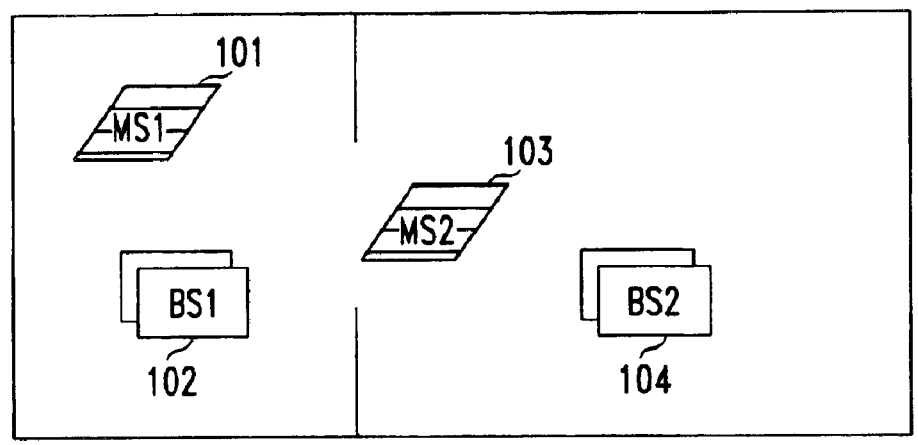
FIG. 1 is a depiction of a prior-art indoor cellular system.
Figure 2:
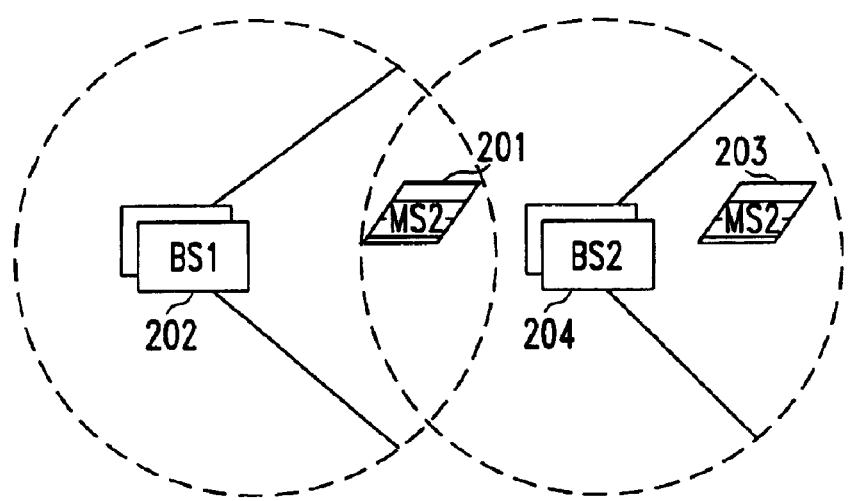
FIG. 2 is a depiction of a prior-art outdoor cellular system.
Figure 3:
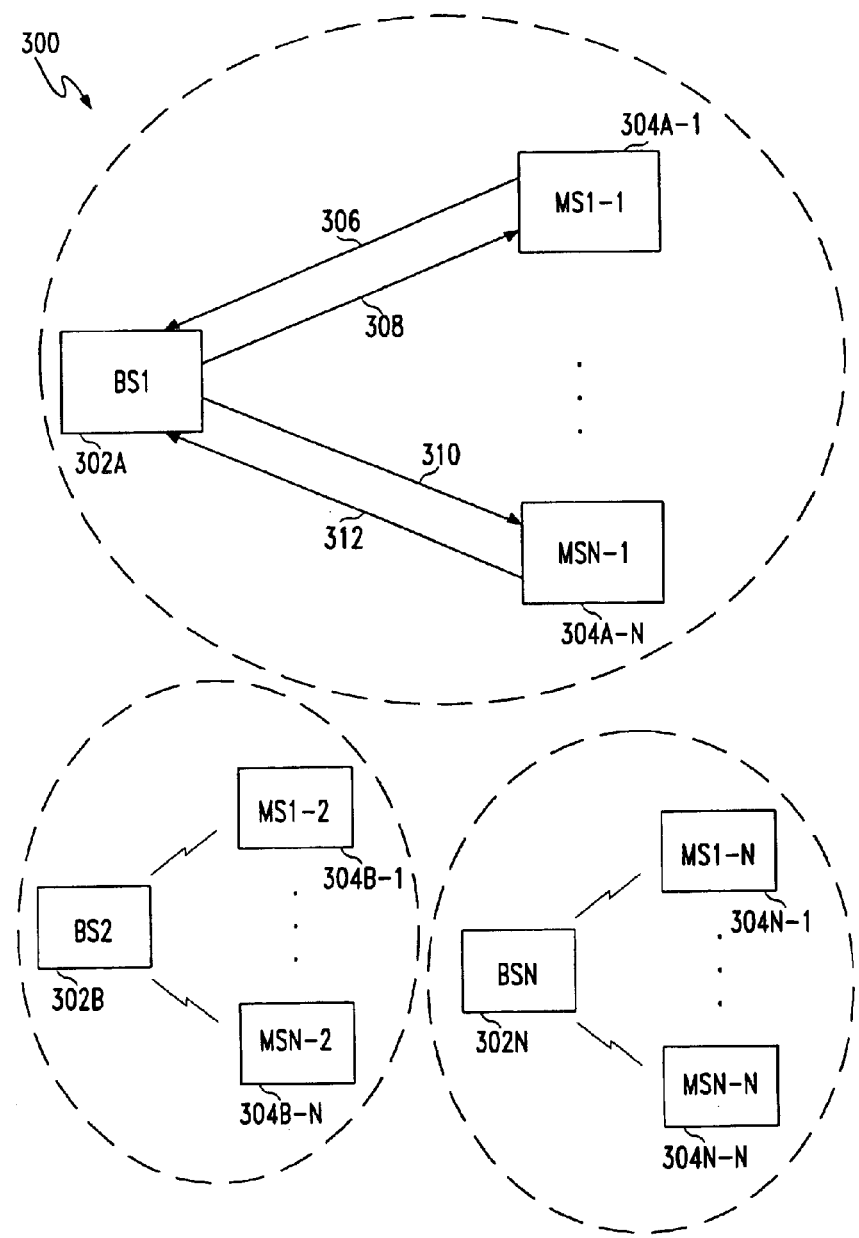
FIG. 3 is an exemplary block diagram of a wireless telecommunications system, in which the present invention may be implemented.

An exemplary wireless telecommunications system 300, in which the present invention may be implemented, is shown in FIG. 3. System 300 includes a plurality of wireless base stations, such as base stations 302A through 302N. Each base station serves, or has registered with it, a plurality of mobile stations. For example, base station 302A has registered with it mobile stations 304A-1 through 304A-N, base station 302B has registered with it mobile stations 304B-1 through 304B-N, and base station 302N has registered with it mobile stations 304N-1 through 304N-N. Each base station communicates with the mobile stations registered with that base station over wireless links. For example, base station 302A communicates with mobile station 304A-1 over wireless links 306 and 308 and with mobile station 304N over wireless links 310 and 312. Links 306 and 312, which communicate from the mobile stations 304A-1 and 304A-N, respectively, to base station 302A are termed uplinks. Links 308 and 310, which communicate from base station 302A to the mobile stations 304A-1 and 304A-N, respectively, are termed downlinks. Calls and/or packets, which terms will be used interchangeably hereinafter, are transmitted from the mobile station to the base station over the uplink, while calls and/or packets are transmitted from the base station to the mobile station over the downlink.

A. Requirements of a Measurement-Based Channel Assignment Admissibility (CAA) Criterion If interfering base stations are engaged in channel assignment concurrently, it is possible that they would select the same channel. Staggering the time when measurement and channel selection decisions are made by interfering base stations, would avoid contention. A reliable channel assignment admissibility (CAA) criterion is obtained for uncoupled channel assignment by returning to the basic requirement: that all the paths along which the assigned channel will traverse must be cleared.

1. Downlink Communication Direction

Considering downlink channel assignment first, the channel assignment admissibility (CAA) criterion would require that (i) the signal transmitted on the candidate downlink channel be received by the mobile without interference, and (ii) the channel assignment cause no interference to active neighboring mobiles.

To satisfy the first point, the mobile with a pending packet must clear the candidate downlink channels by measuring the received signal strength and communicate this information to the serving base station. If the signal is weak, the first criterion will be met. In order to establish the requirement (i) for the downlink CAA criterion one could use a feature like MACA (mobile assisted channel assignment) available in the IS 136 and the GSM air interface standard. Paged mobiles (mobiles with packets pending) would scan candidate downlink channels and measure the received signal strength. Alternatively, when channel reservation and data transmission are separated, the base station could transmit simultaneously pilot tones that correspond to its assigned downlink traffic channels F. Furuya and Y. Akaiwa, "*Channel segregation, a distributed adaptive channel allocation scheme for mobile communications systems*", Trans. IEICE, Vol. E74, June 1991, pp. 1531–1537. Page mobiles scan the transmitted pilots to identify the acceptable downlink channels, of which they would inform their base station. A list, rather than the best channel, is returned to the serving base station, in case more than one mobile report the same channel and in order to accommodate different bit rates through time-slot pooling.

In order to meet criterion (ii), it is necessary to establish whether an active mobile that can be reached at sufficient intensity by a signal emanating from the serving base station, uses the candidate channel. In accordance with the invention, the following two equivalent conditions are established:

(ii.1) whether there are any active mobiles that can be reached by a signal from the serving base station; and (ii.2) whether any of the mobiles so identified use the candidate downlink channel.

The first question can be answered by having the serving base station engage in a measurement of a signal transmitted by the active mobiles on the uplink control channel. By the symmetry found in point-to-point connections, a strong uplink received signal would indicate that the signal on the reverse path would be also strong. The second question can be answered by requiring the control signal to indicate the identity of the downlink channel used by the mobile. For instance, the active mobiles (mobiles with pending packets that have already been assigned a channel) transmit on the uplink control channel pilot tones that correspond to their assigned downlink channel. The serving base station scans the pilots to obtain a measure of both the proximity and, hence, the interference potential from (and to) nearby active mobiles and of the downlink channels these mobiles use. The base station assigns a downlink channel by eliminating from the list of acceptable channels received from the paged mobile the downlink channels already assigned to nearby active mobiles.

2. Uplink Communication Direction

The channel assignment admissibility (CAA) criterion for uplink channel assignment is expressed similarly as the requirement that (i) the signal transmitted on the candidate uplink channel be received by the base station without interference, and (ii) the channel assignment cause no interference to neighboring base stations.

To answer the first question, it is sufficient for the serving base station to clear the candidate uplink channels by measuring the received signal. If the signal is weak, the first criterion will be met. The serving base station scans the uplink traffic channels and measures interference. This could be readily achieved with existing systems by adding a radio at the base station cite. Alternatively, narrow band tones corresponding to the uplink channels used by active mobiles are transmitted by all such mobiles and scanned by the serving base station. A list of acceptable uplink channels is thus constructed.

In order to meet criterion (ii), it is necessary to establish whether a base station that can be reached at sufficient intensity by a signal from the mobile with a pending packet uses the candidate uplink channel. In accordance with the invention, the following two equivalent conditions are established:

(ii.1) which base stations can be reached by a signal from the mobile with the channel request; and (ii.2) whether any of the base stations so identified use the candidate uplink channel.

The first question can be answered by having the paged mobile measure the signal transmitted on the downlink control channel by the neighboring base stations. As before, because of the symmetry in point-to-point connections, a strong downlink received signal would indicate that the signal on the reverse path would be also strong. The second question can be answered by requiring each base station to indicate on its control the identity of the uplink channels used by the mobiles served by that base station. For instance, the base station transmits on a downlink control channel pilot tones that correspond to their assigned uplink channels. A paged mobile scans the pilots to obtain a measure of both its proximity and, hence, the interference potential from (and to) neighboring base stations and of the uplink channels nearby base stations use. The list of noisy uplink channels is conveyed to the serving base station. The base station assigns an uplink channel by eliminating from the list of acceptable channels the list of noisy channels received from the paged mobile.

Figure 4:
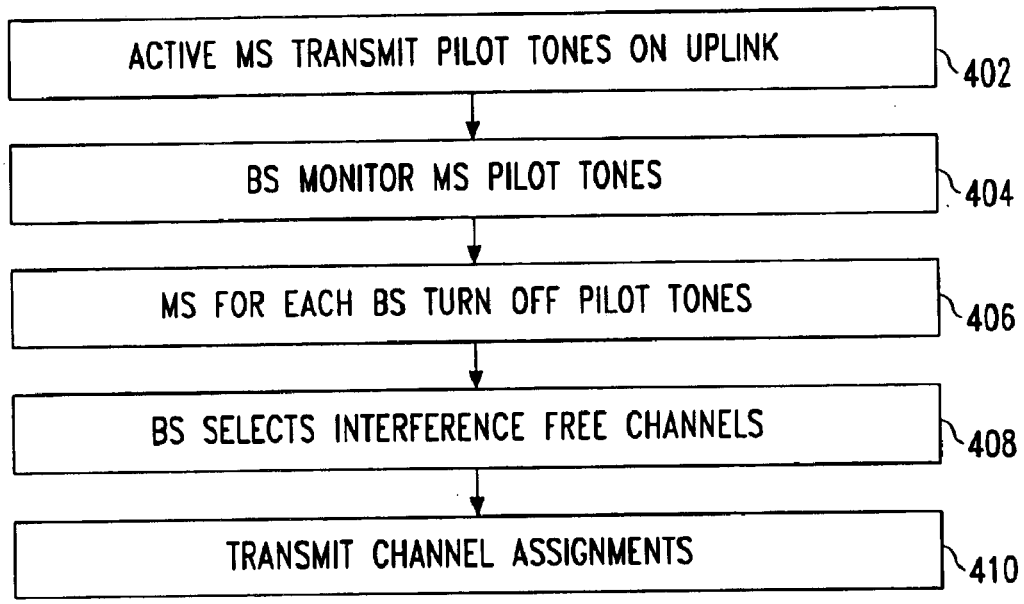
FIG. 4 is a flow diagram of a process of operation of the present invention.

The interference-sensing scheme of the present invention identifies channel use by neighboring cells reliably. A process of operation of the present invention is shown in FIG. 4. The process begins with step 402, in which all active mobile stations transmit pilot tones on the uplink. Each active mobile station transmits a tone corresponding to the downlink channel it has been assigned. In step 404, the base stations monitor the pilot tones transmitted by the mobile stations. In step 406, the mobile stations covered by a given base station will turn off their pilot tones in the assignment frame, which occurs on a staggered schedule for each base station. This allows each base station to determine the cell location of each mobile station whose pilot tone the base station is receiving, and thus determine the channel usage of mobile stations in neighboring cells. In step 408, using the information relating to channel usage of mobile stations in neighboring cells, each base station selects interference-free channels for its mobile stations. In step 410, each base station transmits the channel assignments to each of its mobile stations.

B. Implementation of Proposed Interference-Sensing Scheme

The above schemes can be implemented with a variety of control/signaling mechanisms. The implementation method would depend on the type of traffic, that is, the length of the packet or call and the duration of the measurement and channel selection relative to the packet length. Shorter packets would require faster measurement and channel selection mechanisms. A description of the inventive method is presented for short packet traffic.

1. Downlink Channel Assignment

In order to establish condition (i) for the downlink channel assignment admissibility (CAA) criterion one can use a feature like mobile assisted channel assignment (MACA) available in the IS 136 and the GSM air interface standard. Paged mobiles (mobiles with packets pending) scan candidate downlink channels and measure the received signal strength. Alternatively, in order to reduce measurement delay, the base station could transmit simultaneously pilot tones that correspond to its active downlink traffic channels. See the L. J. Cimini, Jr., et al. reference cited above. Paged mobiles scan the transmitted pilots to identify the acceptable downlink channels, of which they would inform their base station. A list, rather than the best channel, is returned to the serving base station, in case more than one mobile report the same channel and in order to accommodate different bit rates through time-slot pooling.

Criterion (ii) can be established by requiring the active mobiles (mobiles with pending packets that have already been assigned a channel) to transmit on an uplink control channel pilot tones that correspond to their assigned downlink channel. The serving base station scans the pilots to obtain a measure of both the proximity and, hence, the interference potential from (and to) nearby active mobiles and of the downlink channels these mobiles use. The base station assigns a downlink channel by eliminating from the list of acceptable channels received from the paged mobile the downlink channels already assigned to nearby active mobiles.

Figure 5:
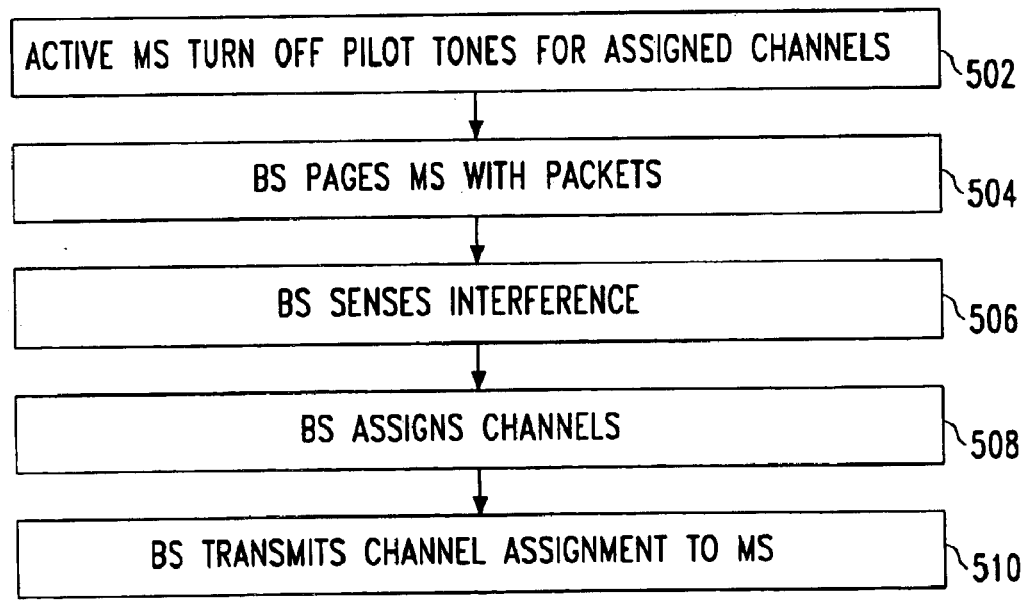
FIG. 5 is a flow diagram of a downlink channel assignment process, according to the present invention.

A process of channel assignment, according to the present invention, which is applicable to assign downlink channels for one-way traffic from the base station to one or more mobile stations, is shown in FIG. 5. The process begins with step 502, in which the active mobile stations registered with the base station turn off the pilot tones corresponding to their assigned downlink channels. In step 504, the base station pages the registered mobiles with pending traffic packets. In step 506, the base station performs interference sensing to identify interference-free downlink channels. In step 508, the base station assigns downlink traffic channels to the paged mobiles to receive their pending packets. In step 510, the base station transmits the channel assignments to the mobile stations. In all other frames of a superframe the active mobiles registered with the base station will transmit their pilot tones corresponding to the assigned downlink channels.

Figure 6:
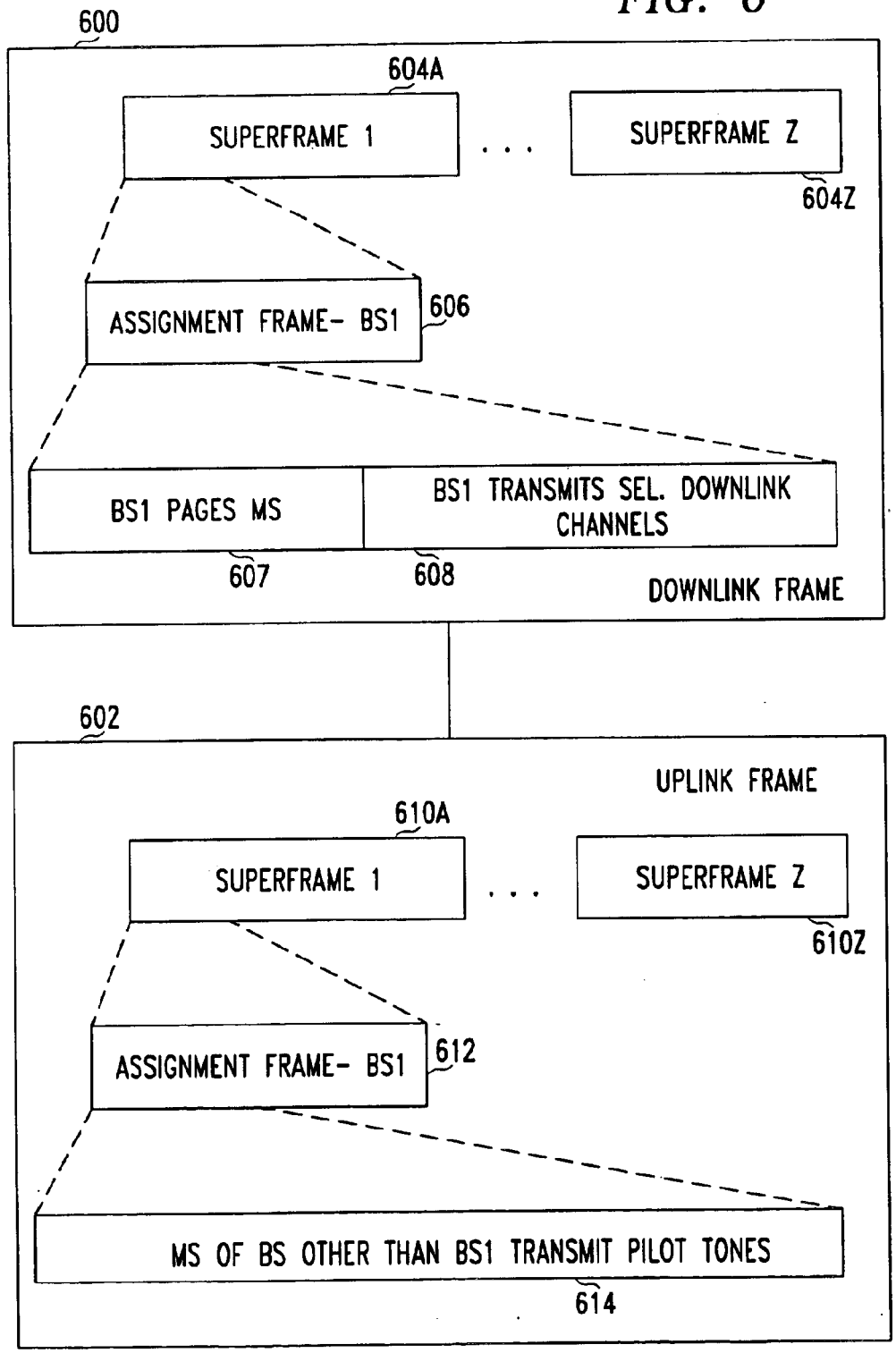
FIG. 6 is an exemplary format of a superframe, in which the process shown in FIG. 5 is carried out.

Each base station is assigned a frame within each superframe, in which the process shown in FIG. 5 is carried out. Since the mobiles served by interfering base stations turn off their pilots in the different frames within a superframe, the number of frames per superframe must be equal to at least the re-use factor needed to deliver the desired reception. An exemplary frame structure, according to the present invention, is shown in FIG. 6. The depicted frame structure assumes that there is one-way traffic from the base station to the mobile. Frame structure 600 is an example of a downlink frame structure, while frame structure 602 is an example of an uplink frame structure.

Downlink frame structure 600 includes a plurality of superframes, such as super-frames 604A to 604Z. Each superframe includes a plurality of assignment frames, such as assignment frame 606, which is the assignment frame for an exemplary base station, designated BS1. Each assignment frame is used to determine channel assignments for each neighboring base station. Each assignment frame includes a plurality of segments, such as segments 607 and 608, in which transmissions from the base station to one or more mobile stations occur. For example, in segment 607, base station BS1 pages the active mobile stations registered with base station BS1, as in step 504 of FIG. 5. In segment 608, base station BS1 transmits the selected downlink channels to the mobile stations, as in step 510 of FIG. 5.

Uplink frame structure 602 includes a plurality of superframes, such as super-frames 610A to 610Z. Each superframe includes a plurality of assignment frames, such as assignment frame 612, which is the assignment frame for an exemplary base station, designated BS1. Each assignment frame is used to determine channel assignments for each neighboring base station. Each assignment frame includes a plurality of segments, such as segment 614, in which transmissions from one or more mobile stations to the base station occur. For example, in segment 614, the mobile stations registered with base station BS1 stop transmitting their pilot tones, as in step 502 of FIG. 5, and the mobile stations of base stations other than base station BS1 transmit their pilot tones.

2. Uplink Channel Assignment

Uplink channel assignment is similar to downlink channel assignment. Condition (i) for the uplink channel assignment admissibility (CAA) criterion would require the serving base station to scan the uplink traffic channels and measure interference. This could be readily achieved with existing systems by adding a radio at the base station cite. Alternatively, narrow band tones corresponding to the uplink channels used by active mobiles are transmitted by all such mobiles and scanned by the serving base station. A list of acceptable uplink channels is thus constructed.

Criterion (ii) can be established by requiring the base stations to transmit on a downlink control channel pilot tones that correspond to their assigned uplink channels. A paged mobile scans the pilots to obtain a measure of both its proximity and, hence, the interference potential from (and to) neighboring base stations and of the uplink channels nearby base stations use. The list of noisy uplink channels is conveyed to the serving base station. The base station assigns an uplink channel by eliminating from the list of acceptable channels the list of noisy channels that was received from the paged mobile.

Figure 7:
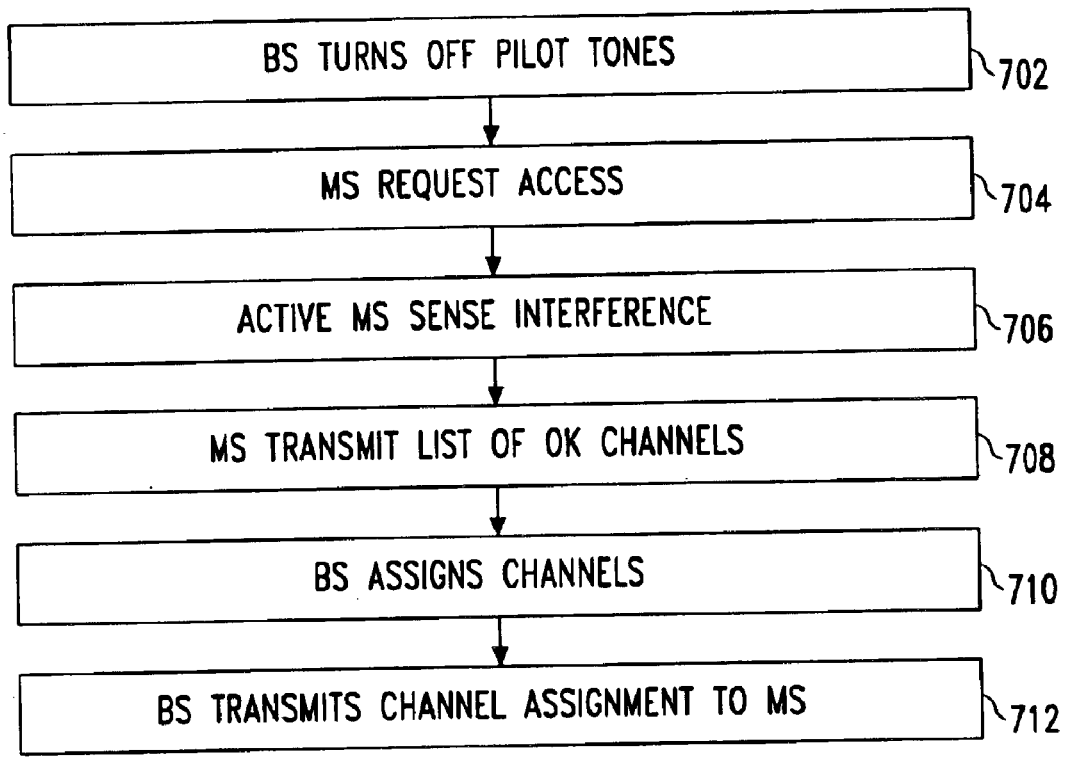
FIG. 7 is a flow diagram of an uplink channel assignment process, according to the present invention.

In general, when one-way traffic from the mobile to the base stations is involved, the roles of the base stations and mobiles are reversed. A process of channel assignment, according to the present invention, which is applicable to assign uplink channels for one-way traffic from one or more mobile stations to the base station, is shown in FIG. 7. The process begins with step 702, in which the base station turns off its pilot tones corresponding to the assigned uplink channels. In step 704, the mobile stations registered with base station BS1, which are generating traffic packets, request access for those packets. In step 706, the active mobile stations engage in interference sensing to identify interference-free uplink channels. In step 708, each active mobile station transmits to the base station its list of uplink channels that it identified as being acceptably interference-free uplink channels. In step 710, the base station examines the received lists of channels, selects channels that are overall acceptably interference-free, and assigns uplink channels to the mobile stations that requested access in step 704. In step 712, the base station transmits the channel assignments to the mobile stations that requested access. In all other frames of a superframe the base station will transmit its pilot tones corresponding to the assigned uplink channels. As described above, since the interfering base stations do not turn off their pilot tones in the same frame, the number of frames per superframe must be at least equal to the re-use factor needed to deliver the desired reception quality.

Figure 8:
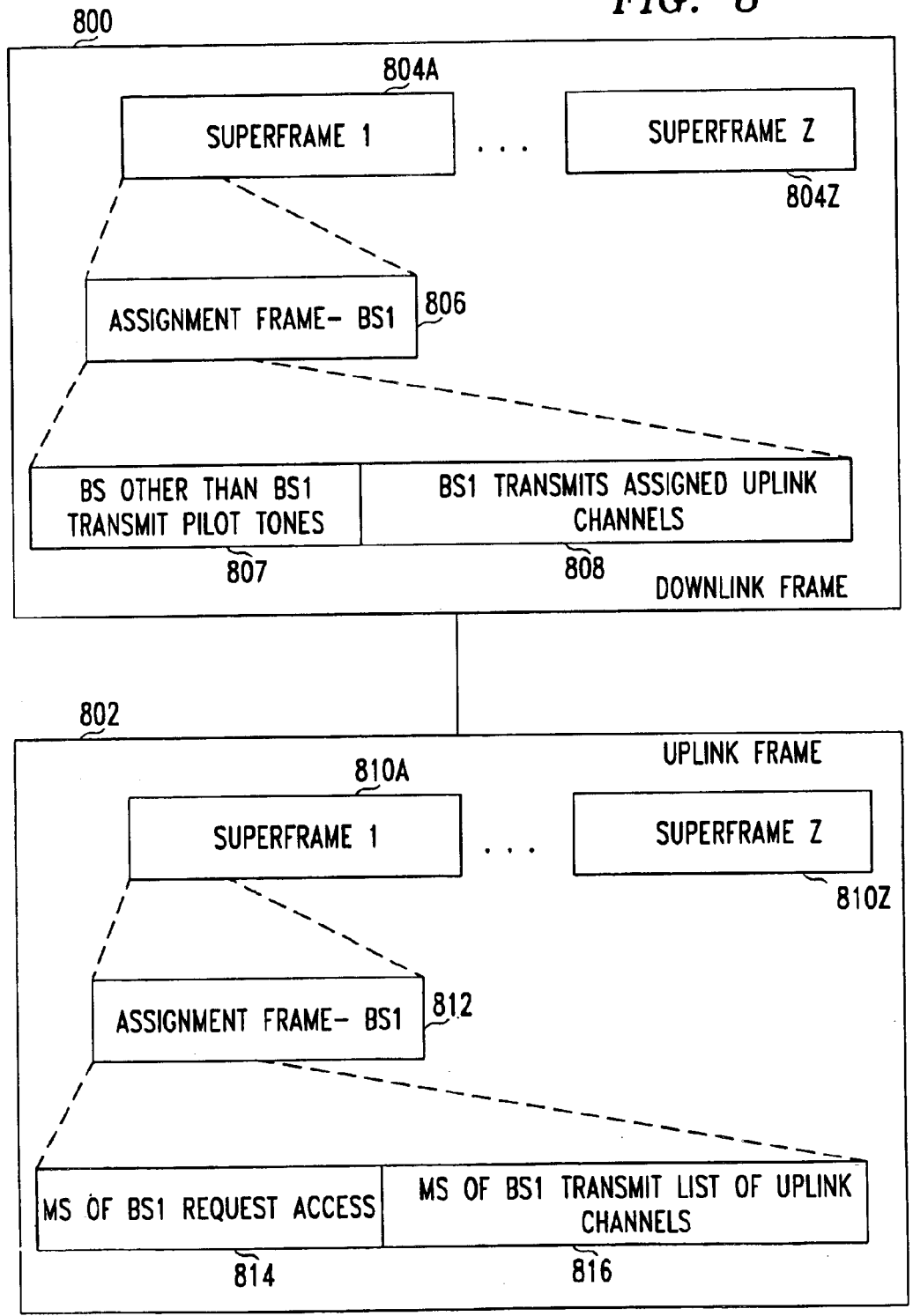
FIG. 8 is an exemplary format of a superframe, in which the process shown in FIG. 7 is carried out.

Each base station is assigned a frame within each superframe, in which the process shown in FIG. 7 is carried out. An exemplary frame structure, according to the present invention, is shown in FIG. 8. The depicted frame structure assumes that there is one-way traffic from a mobile station to the base stations. Frame structure 800 is an example of a downlink frame structure, while frame structure 802 is an example of an uplink frame structure.

Downlink frame structure 800 includes a plurality of superframes, such as super-frames 804A to 804Z. Each superframe includes a plurality of assignment frames, such as assignment frame 806, which is the assignment frame for an exemplary base station, designated BS1. Each assignment frame is used to determine channel assignments for each neighboring base station. Each assignment frame includes a plurality of segments, such as segments 807 and 808, in which transmissions from base stations to one or more mobile stations occur. For example, in segment 807, base station BS1 turns off its pilot tones corresponding to the assigned uplink channels, while base stations other than BS1 continue to transmit their pilot tones, as in step 702 of FIG. 7. In segment 808, base station BS1 transmits the assigned uplink channels to the mobile stations, as in step 712 of FIG. 7.

Uplink frame structure 802 includes a plurality of superframes, such as super-frames 810A to 810Z. Each superframe includes a plurality of assignment frames, such as assignment frame 812, which is the assignment frame for an exemplary base station, designated BS1. Each assignment frame is used to determine channel assignments for each neighboring base station. Each assignment frame includes a plurality of segments, such as segments 814 and 816, in which transmissions from one or more mobile stations to the base station occur. For example, in segment 814, the mobile stations registered with base station BS1, which are generating traffic packets, request access for those packets, as in step 704 of FIG. 7. In segment 816, each active mobile station transmits to the base station its list of uplink channels that it identified as being acceptably interference-free uplink channels, as in step 708 of FIG. 7.

II. Medium Access Control for Packet Traffic

In accordance with the invention, a scheme for uncoupling the channel assignment of uplink and downlink traffic is presented. Additional considerations are posed by packet traffic, namely the need for fast channel assignment decisions and the avoidance of contention. Certain concepts can be borrowed from the interference-sensing scheme proposed for downlink channel assignment in the L. J. Cimini, Jr., et al. reference cited above, as it addresses some of these issues satisfactorily. The invention differs from that scheme by eliminating the interference that would occur occasionally due to insufficient measurement data, the introduction of some equity features, and QoS awareness. Additionally, in accordance with the invention, an interference-sensing scheme for uplink channel assignment is provided.

A. The Method

In accordance with the invention, a medium access control scheme is provided for uncoupled downlink and uplink channel assignment that accommodates packet of fixed length (as with ATM) or variable length (as with IP). the invention works with either frequency-division and time-division multiplex techniques.

In accordance with the invention, narrow-band pilot tones are used, corresponding to assigned traffic channels, as seen in the L. J. Cimini, Jr., et al. reference cited above. Such tones can be scanned quickly and conveniently with OFDM modulation. While using strong synchronization between base stations and their mobiles, scanning of the pilot tones is staggered in order to avoid contention for the same channel between mutually interfering base stations with concurrent traffic. A base station is assigned within each super-frame a frame, referred to as the assignment frame, during which it transmits its tones. Mobiles scan the tones and report a list of channels with low interference to the serving base station. The base station selects a channel and notifies the mobile.

The interference-sensing scheme in the L. J. Cimini, Jr., et al. reference cited above, is modified as follows. First, in addition to requiring the base stations to transmit tones corresponding to the downlink channels acquired for their use, the active mobiles also do the same on the uplink. That is, all active mobiles transmit a tone corresponding to the downlink channel each mobile has been assigned. And, in addition to the mobiles engaging in signal measurement (and transmission of the list of admissible channels to the base station), the serving base station will also listen to the tones transmitted by the active mobiles. In order to be able to stagger channel-assignment times, the active mobiles will turn off their pilots during their base station's assignment frame, just like the base station will turn off its pilot tones during its channel assignment frame so that mutually interfering base stations do not select channels concurrently. From its measurements, the base station thus constructs its own list of admissible channels. Eliminating the channels absent from the base station's list of admissible channels will shorten the list of admissible channels received from the paged mobile.

An analogous interference-sensing scheme is proposed for uplink channel assignment. Instead of transmitting tones that correspond to assigned downlink channels, all the base stations and their active mobiles transmit tones corresponding to the assigned uplink channels.

In theory, both frequency-division and time-division duplex can support uncoupled channel assignment between uplink and downlink. With frequency-division duplex, a different number of channels would be made available in the two directions when the traffic loads along the two directions differ.

Figure 9:
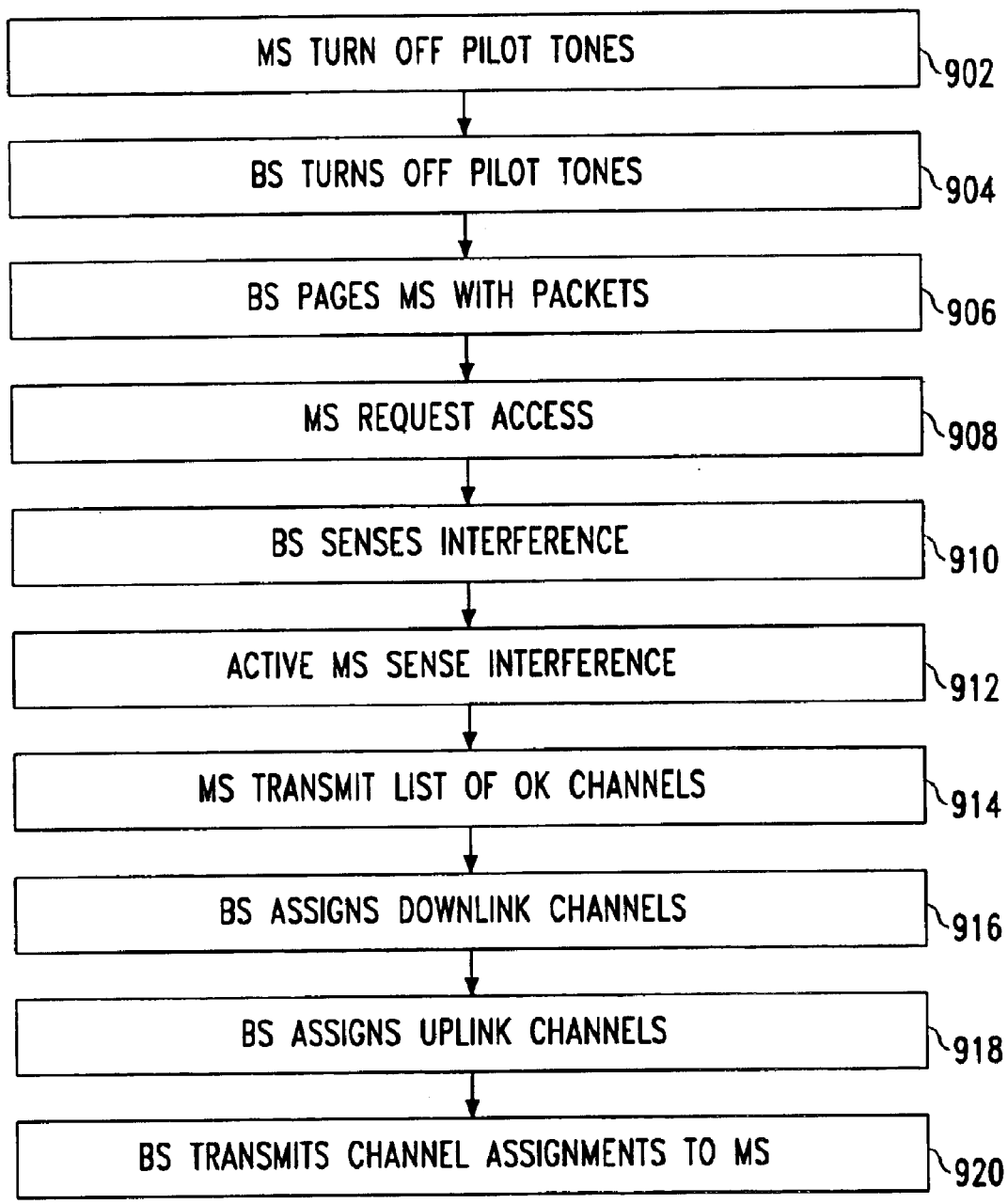
FIG. 9 is a flow diagram of a downlink channel and uplink channel assignment process, according to the present invention.

A process of channel assignment, according to the present invention, which is applicable to assign uplink channels for asymmetric two-way traffic between one or more mobile stations and the base station, is shown in FIG. 9. The process begins with step 902, the active mobile stations registered with the base station turn off the pilot tones corresponding to their assigned downlink channels, while active mobile stations registered with base stations other than that base station continue transmitting their pilot tones. In step 904, the base station turns off its pilot tones corresponding to the assigned uplink channels. In step 906, the base station pages the registered mobiles with pending traffic packets. In step 908, the mobile stations registered with base station BS1, which are generating traffic packets, request access for those packets. In step 910, the base station performs interference sensing to identify interference-free downlink channels. In step 912, the active mobile stations engage in interference sensing to identify interference-free uplink channels. In step 914, each active mobile station transmits to the base station its list of uplink channels that it identified as being acceptably interference-free uplink channels. In step 916, the base station assigns downlink traffic channels to the paged mobiles to receive their pending packets. In step 918, the base station examines the received lists of channels, selects channels that are overall acceptably interference-free, and assigns uplink channels to the mobile stations that requested access in step 904. In step 920, the base station transmits the channel assignments to the mobile stations that requested access. In all other frames of a superframe the active mobile stations registered with the base station will transmit their pilot tones corresponding to the assigned downlink channels and the base station will transmit its pilot tones corresponding to the assigned uplink channels. As described above, since the interfering base stations do not turn off their pilot tones in the same frame, the number of frames per superframe must be at least equal to the re-use factor needed to deliver the desired reception quality.

Figure 10:
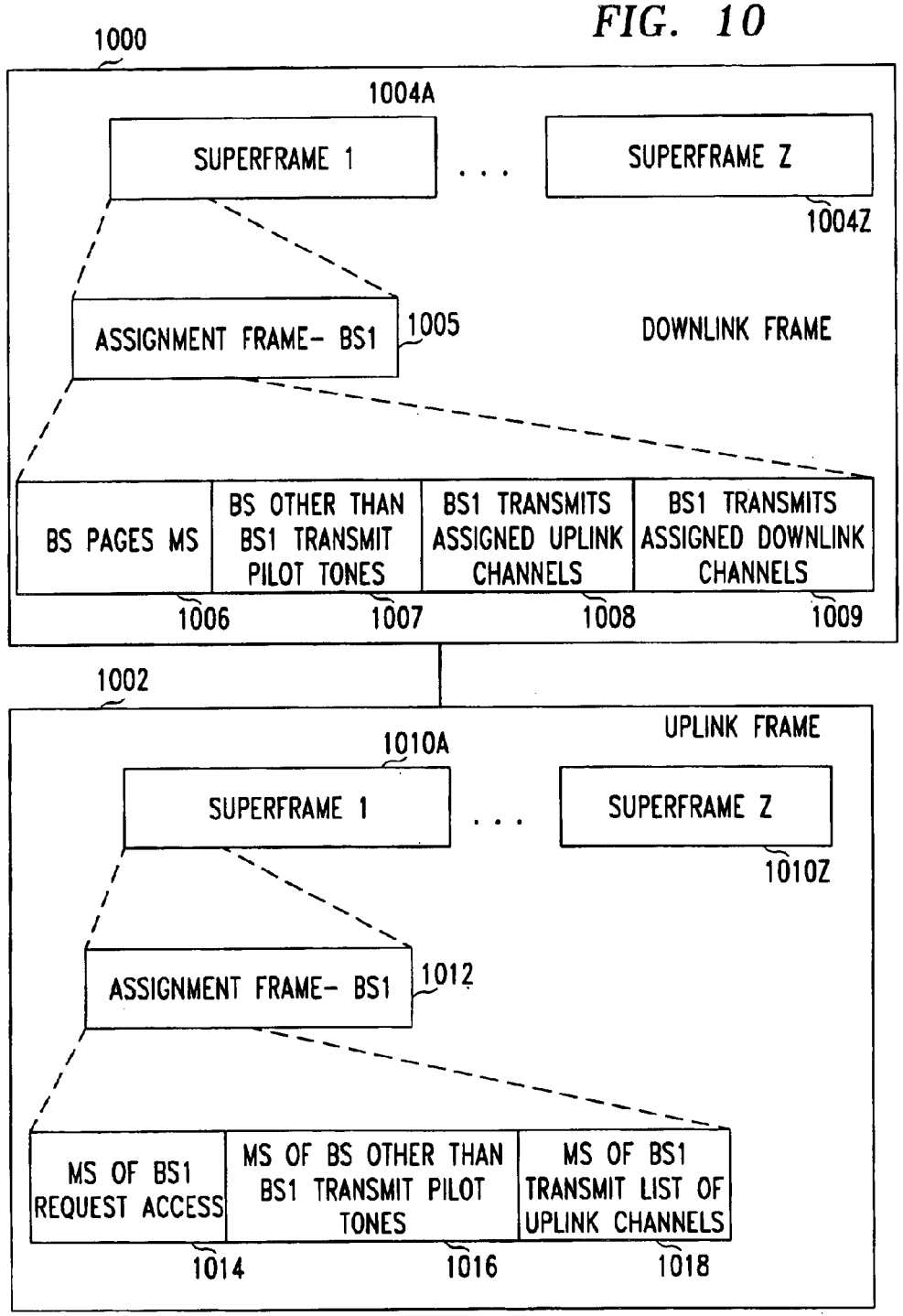
FIG. 10 is an exemplary format of a superframe, in which the process shown in FIG. 9 is carried out.

Each base station is assigned a frame within each superframe, in which the process shown in FIG. 9 is carried out. An exemplary frame structure, according to the present invention, is shown in FIG. 10. The depicted frame structure assumes that there is two-way traffic from a mobile station to the base stations. Frame structure 1000 is an example of a downlink frame structure, while frame structure 1002 is an example of an uplink frame structure.

Downlink frame structure 1000 includes a plurality of superframes, such as super-frames 1004A to 1004Z. Each superframe includes a plurality of assignment frames, such as assignment frame 1006, which is the assignment frame for an exemplary base station, designated BS1. Each assignment frame is used to determine channel assignments for each neighboring base station. Each assignment frame includes a plurality of segments, such as segments 1006, 1007, 1008, and 1009, in which transmissions from base stations to one or more mobile stations occur. For example, in segment 1006, base station BS1 pages the active mobile stations registered with base station BS1, as in step 906 of FIG. 9. In segment 1007, base station BS1 turns off its pilot tones corresponding to the assigned uplink channels, while base stations other than BS1 continue to transmit their pilot tones, as in step 904 of FIG. 9. In segment 1008, base station BS1 transmits the assigned uplink channels to the mobile stations, as in step 920 of FIG. 9. In segment 1009, base station BS1 transmits the assigned downlink channels to the mobile stations, as in step 920 of FIG. 9.

Uplink frame structure 1002 includes a plurality of superframes, such as super-frames 1010A to 1010Z. Each superframe includes a plurality of assignment frames, such as assignment frame 1012, which is the assignment frame for an exemplary base station, designated BS1. Each assignment frame is used to determine channel assignments for each neighboring base station. Each assignment frame includes a plurality of segments, such as segments 1014, 1016, and 1018, in which transmissions from one or more mobile stations to the base station occur. For example, in segment 1014, the mobile stations registered with base station BS1, which are generating traffic packets, request access for those packets, as in step 908 of FIG. 9. In segment 1016, the active mobile stations registered with the base station turn off the pilot tones corresponding to their assigned downlink channels, while active mobile stations registered with base stations other than that base station continue transmitting their pilot tones, as in step 902 of FIG. 9. In segment 1018, each active mobile station transmits to the base station its list of uplink channels that it identified as being acceptably interference-free uplink channels, as in step 914 of FIG. 9.

B. The Time-Division Duplex Method

A frame structure description for uncoupled channel assignment is presented in the context of a time-division duplex arrangement. Either downlink or uplink channels can be assigned by the proposed scheme, which can also accommodate the uncoupled channel assignment on the two directions concurrently. The proposed scheme is described in the context of the latter. Time-division duplex allows the allocation of the radio resource between the two directions without the need for planning. Moreover, it can achieve more efficient channel training.

The concepts presented here can be used with protocols for fixed length packets (like ATM packets) or for variable-length packets (like IP packets). If the traffic involves variable-length packets, which are multiple time-slots in length, several channels (time slots) may be reserved within the same super-frame in order to achieve higher user bit rates. It is also possible to achieve continuous transmission of a packet over several super-frames without the need for channel reselection. The extent to which these options are exercised will depend on the QoS priority of the packet stream, inter-stream synchronization, and other traffic management considerations. As these options are the purview of the particular channel assignment algorithm employed, their implementation is left out of this discussion.

Each super-frame comprises a set of assignment frames to be used for channel assignment/reservation purposes, plus additional segments to be used for reserved and unreserved traffic, in either direction. Each base station is scheduled to perform channel assignment during one of the assignment frames. In subsequent assignment frames, the base station helps coordinate the channel assignment process of its neighbor base stations. Specifically, in frames following its scheduled assignment frame, a base station will transit pilot tones corresponding to the channels that have already been reserved for its use for that super-frame. The reserved channels could be either uplink channels or downlink, or both if a base station is handling both types on traffic in a super-frame. The pilot tones of the reserved channels will continue to be transmitted over all super-frames for which a channel has been reserved. In all assignment frames other than the scheduled assignment frame, the active mobiles of a base station (which are the mobiles that have already been paged and undergone channel assignment for the present super-frame) will transmit tones corresponding to the channel(s) reserved for their respective use.

Figure 11:
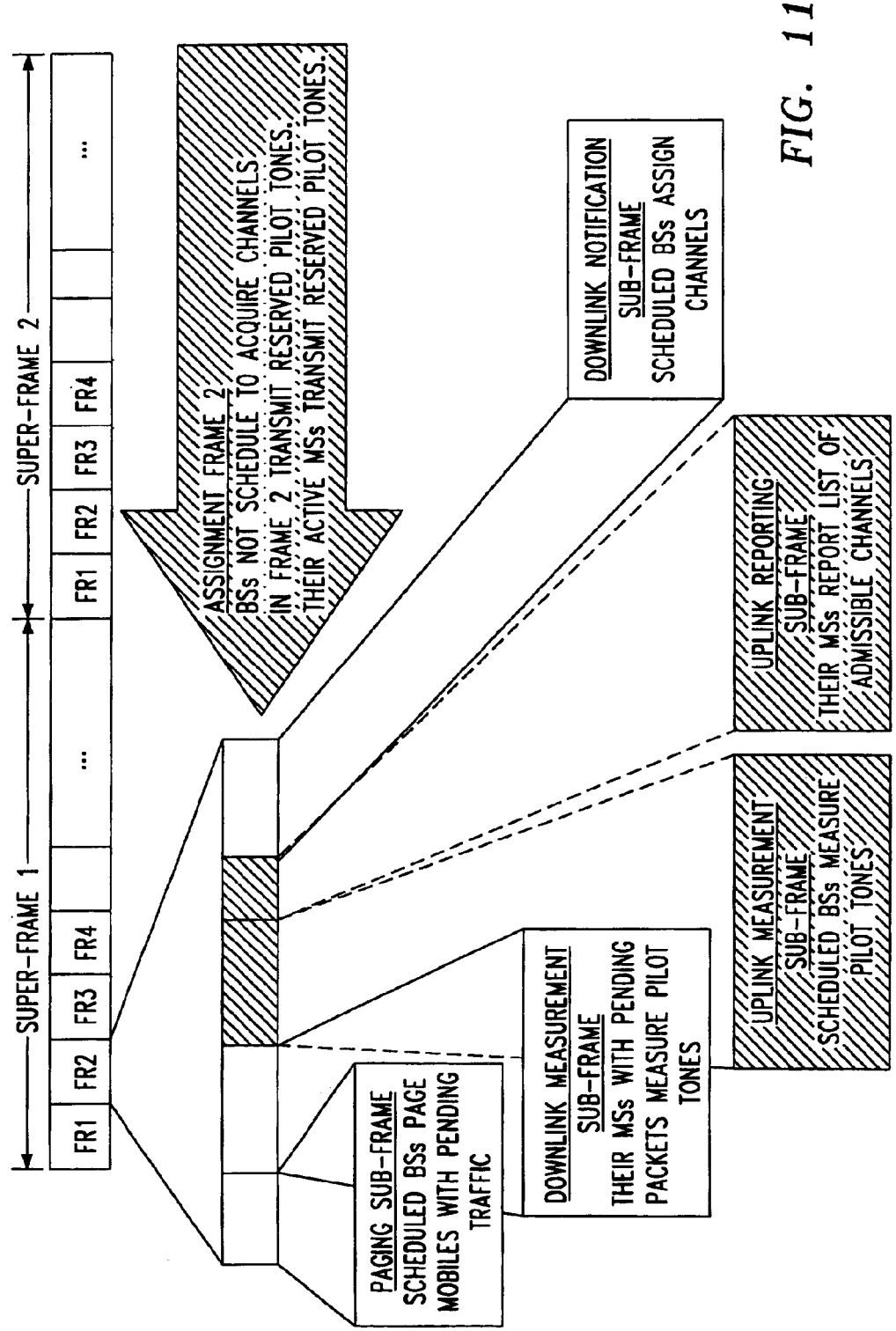
FIG. 11 illustrates a frame structure for directionally uncoupled channel assignment, in accordance with the invention.

As illustrated in FIG. 11, the assignment portion of the super-frame consists of alternating downlink and uplink segments, which are separated by an idle time interval to allow the radios to switch from transmitting to receiving. An assignment frame comprises a downlink paging sub-frame, a downlink measurement sub-frame, followed by an uplink measurement sub-frame, and an uplink reporting sub-frame, then followed by a downlink notification sub-frame.

During the assignment frame of a base station, the following control functions will be carried out:
the base station turns off its pilots;
the active mobiles served by the base station turn off their pilot tones;
the base station pages its registered mobiles with pending traffic packets on the downlink paging sub-frame;
the paged mobiles are engaged in interference sensing on the downlink measurement sub-frame to identify interference-free channels;
the base station engages in interference sensing on the uplink measurement sub-frame to identify interference-free channels;
the list of acceptable channels are reported by the paged mobiles to the base station on the uplink reporting sub-frame; and
the base station assigns traffic channels to the paged mobiles on which to receive their pending packets and broadcasts their identity on the downlink notification sub-frame.

III. Performance of the Medium Access Control Scheme

The performance of the proposed interference-sensing scheme for downlink and uplink channel assignment is measured in terms of the drop in the S/I ratio or the increase in the retransmission probability the proposed scheme would help prevent when compared to a scheme that employs mobile measurements only. A system of sectorized cells is considered, each having three sectors with a 120-degree beam-width with a front-to-back ratio of 20 dB.

Figure 12:
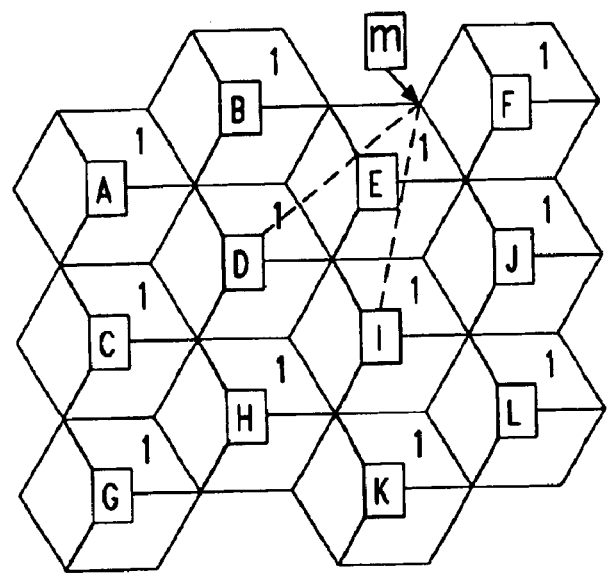
FIG. 12 illustrates a hexagonal base station layout.

Two layouts are considered. One is a hexagonal pattern, as illustrated in FIG. 12. sector D1 might re-use the channels used by sectors B1 and E1 since the mobile performing interference measurements would not receive a sufficiently strong signal from these sectors. Conversely, a mobile in sector E1 could receive co-channel interference contributed by sectors A1 D1, I1, and L1. Moreover, if the mobiles active in the coverage area of sectors B1 and J1 are shielded from the signal from sector E1, sectors B1 and J1 could also contribute to the interference at mobile m. Assuming an interference limited system, a propagation loss coefficient of 4, and a measured S/I ratio of 10 dB, the S/I ratio penalty experienced by a mobile at location m in the coverage area of sector E1 could be as high as 4.25 dB, as shown in Appendix I.

Figure 13:
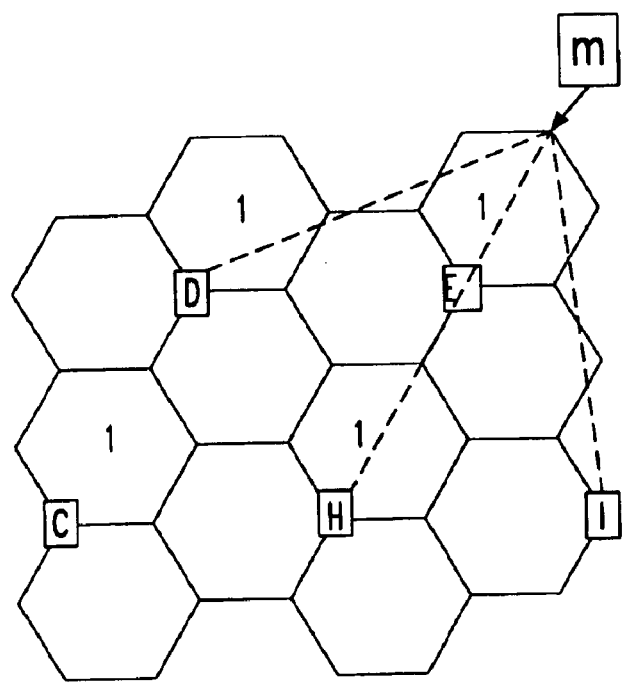
FIG. 13 illustrates a cloverleaf base station layout.

Also a system arranged in a cloverleaf pattern is considered, as illustrated in FIG. 13. In this situation sector H1 might re-use the channels used by sectors D1, E1, and I1 since the mobile performing interference measurements would not receive a sufficiently strong signal from these sectors. Conversely, a mobile in sector E1 could receive co-channel interference contributed by sectors D1, I1, and H1. The S/I ratio penalty experienced by a mobile at location m in the coverage area of sector E1 could be as high as 3.99 dB for this arrangement, as shown in Appendix I.

An S/I ratio penalty of such magnitude would cause a word-error-rate experienced in packet transmission, and packet re-transmission probability, higher by an order of magnitude for the OFDM signal analyzed in the L. J. Cimini, Jr., et al. reference cited above, when employing four transmit and two receive antennas for 40-$\mu$sec delay spread, 10-Hz Doppler, and QPSK with differential detection and ½-rate Reed-Solomon coding.

One might be tempted to dismiss this result because location m is just one location and the impact on the average S/I ratio [or other statistical metric] might be less severe. To this one would rebut that the interference penalty realized at other locations may be either lower or higher depending on the power control policy employed and the rules for channel assignment, typically prescribed by the dynamic channel assignment algorithm implemented in conjunction with interference sensing. For instance, consider the case where both Sectors D1 and I1 assigned the same channel as that assigned to a mobile served by Sector E1 to transmit packets to mobiles located on their respective cell boundaries; namely locations n and l, respectively. If the power control policy equalized the received signal strength, most mobile locations in Sector E1 could experience a lower S/I ratio than location m as they are closer to base stations D and I. Different scenarios could be described whereby location m would experience the lowest S/I ratio of all locations in Sector E1.

But even if all other locations in Sector E1 experienced a higher S/I ratio than location m, and as a result the S/I statistics across the cell are affected less severely by an interference-sensing scheme that misses some times, that would not be relevant to users of fixed wireless systems, for instance. They stay in the same position, always experiencing the same performance. Unlike with mobile users, whose movement to different locations will result in a better average performance, the higher S/I ratio experienced elsewhere in the cell is irrelevant to the fixed-wireless user. The same applies to portable computing users if they are likely to select their point of connection based on factors other than signal quality.

Of course, it is possible to design heuristic channel assignment algorithms that compensate for the missing interference information. For example, measurement-based dynamic channel assignment combined with channel segregation, See F. Furuya and Y. Akaiwa, "Channel segregation, a distributed adaptive channel allocation scheme for mobile communications systems", Trans. IEICE, Vol. E74, June 1991, pp. 1531–1537. There, re-use patterns are determined from empirically observed transmission successes and failures, helps avoid situations like those described in this section. See the L. J. Cimini, Jr., et al. reference cited above. Greater efficiency would be achieved, however, if co-channel interference was avoided reliably (through the use of the proposed interference-sensing scheme) and the channel assignment algorithm was selected to better focus on maximizing throughput.

Figure 14:
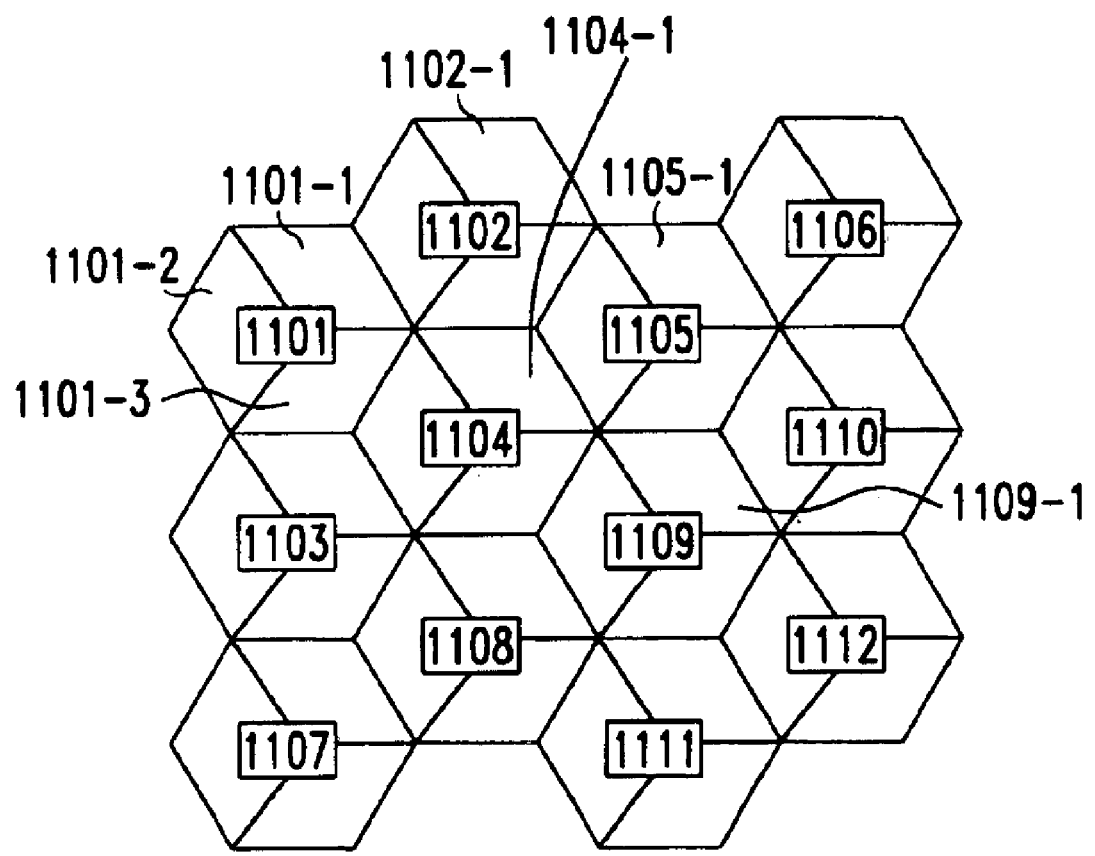
FIG. 14 is an example of a wireless telecommunications system, according to the present invention.

The performance of the interference-sensing scheme of the present invention may be quantified in terms of the deterioration of the quality of service requirement it helps prevent. For example, in the case in which the CAA criterion employed for downlink channel assignment relies only upon mobile measurements, the result would be substantial interference increase. An example of base stations arranged in a hexagonal pattern is shown in FIG. 14. FIG. 14 shows a plurality of base stations 1101–1112, each base station having three sectors with a 120-degree beamwidth. For example, base station 1101 has three sectors 1101-1, 1101-2, and 1101-3. If the front-to-back ratio is 20 dB, sector 1104-1 could re-use the channels used by sectors 1102-1 and 1105-1 since the mobile stations performing interference measurements would not receive a sufficiently strong signal from these sectors. Conversely, a mobile in sector 1105-1 could receive co-channel interference contributed by sectors 1101-1, 1104-1, and 1109-1.

Assuming an interference limited system, a propagation loss coefficient of 4, and a target S/I ratio of 10 dB, the S/I ratio penalty experienced by a mobile station in the coverage area of sector 1105-1 could be as high as 3 dB. A penalty of such magnitude would cause the word-error-rate experienced in packet transmission, and the packet re-transmission probability, to increase by an order of magnitude when employing four transmit and two receive antennas for 40-$\mu$sec delay spread, 10-Hz Doppler, and QPSK with differential detection and ½ rate Reed-Solomon coding.

A. Other Considerations

1. Battery-Life Awareness

This protocol imposes little additional burden of the battery of the mobiles. Although mobiles are asked to broadcast their assigned tones, this is required only of the paged mobiles that have been assigned a channel and are ready to receive/transmit in a super-frame. The broadcast occurs only during the assignment portion of that super-frame.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

The resulting invention provides an interference-sensing medium access method that meets this condition for asymmetric dynamic channel assignment. The invention can be used with traffic consisting of either circuit-switched calls or with packets; the packet length may either fixed or variable.

It is to be understood that the above-described embodiments are merely illustrative of the principles of the invention. Various modifications and changes may be made thereto by those skilled in the art that will embody the principles of the invention and fall within the spirit and scope thereof.

Appendix I

The interference penalty resulting an interference-sensing scheme whereby only downlink signal measurements are available to determine whether a channel is used by another base station is estimated by considering mobile m, which is covered by a base station E1 in FIG. 12. Potentially m receives interference from vase stations B1, J1, D1, and I1. The interference from each is calculated as follows:

To roughly estimate the penalty on the S/I that would be experienced by the mobile at location m, we assume that propagation loss coefficient is 4. we let R be the cell radius, S the serving signal at location m, and interf(P) the interference contributed to location m, from source P. The interference from each sector and the maximum potential interference IP are calculated as follows:

$$S = \alpha/R^4$$

$$\text{Interf}(B1) = \text{Interf}(J1) = S*R^4/(Bm)^4 = S/16 = 0.0625*S$$

$$(Bm) = (Jm) = 2*R$$

$$\text{Interf}(D1) = \text{Interf}(I1) = S*R^4/(Dm)^4 = S/49 = 0.0625*S$$

$$(Dm)^2 R^2 + 4R^2 - 4R^2 * \cos(120°) = (1+4+2)*R^2 = 7R^2$$

$$IP = \text{Interf}(B1) + \text{Interf}(D1)*2 = 0.1658*S$$

If the target S/I ratio is 10 dB, the total co-channel interference and S/I experienced by mobile m would be:

$$TI = 0.1*S + 0.1658*S = 0.2658*S$$

$$S/I = S/0.2658*S = 3.762 = 5.75 \text{ dB}$$

This represents a 4.25 dB penalty.

FIG. 13 illustrates a cloverleaf arrangement for sectorized base stations, whereby abase station is located a vertex of a hexagon (instead of its center, as seen in FIG. 12). A mobile at location m could potentially receive interference from sectors D1, H1 and I1. The interference contributed by each sector and the maximum potential interference IP are as follows:

$$\text{Interf}(D1) = \text{Interf}(I1) = S*R^4/(Dm)^4 = 0.0625*S$$

$$(Dm)^2 = 25 \cdot R^2 - 9 \cdot R^2 = 16 \cdot R^2$$

$$\text{Interf}(H1) = S*(2R)^4/(Hm)^4 = 0.0256*S$$

$$(Hm) = 5 \cdot R$$

$$IP = (\text{Interf}(D1))*2 + \text{Interf}(H1) = 0.1506*S$$

If the design target for the S/I ratio were 10 dB, then the combined interference TI and the S/I experienced by a mobile at location m would be:

$$TI = 0.1*S + 0.1506*S = 0.2506*S$$

$$S/I = S/(0.2506*S) = 3.9904 = 6.01 \text{ dB}$$

This represents a 3.99 dB penalty.

What is claimed is:

1. A method of assigning a downlink channel to a mobile station registered with a base station, comprising the steps of:
   a) turning off pilot tones being transmitted by a plurality of active mobile stations registered with the base station, each turned off pilot tone corresponding to an assigned downlink channel;
   b) paging the mobile station with a pending traffic packet from the base station;
   c) performing interference sensing at the base station to identify interference-free downlink channels;
   d assigning, at the base station, a downlink traffic channel to the mobile station to receive the pending packets;
   e) transmitting the downlink channel assignment from the base station to the mobile station; and
   wherein there are a plurality of base stations and steps a)–e) are performed successively for each of the plurality of base stations.

2. A method of assigning an uplink channel to a mobile station registered with a base station, comprising the steps of:
   a) turning off pilot tones being transmitted by the base station, each pilot tones corresponding to an uplink channel assigned to one of a plurality of active mobile stations registered with the base station;
   b) requesting access from the mobile station for a traffic packet;
   c) performing interference sensing at the plurality of active mobile stations to identify interference-free uplink channels;
   d) transmitting from each one of the plurality of active mobile stations a list of uplink channels identified as being acceptably interference-free;
   e) assigning, at the base station, an uplink channel to the mobile station; and
   f) transmitting the uplink channel assignment from the base station to the mobile station.

3. The method of claim 2, wherein uplink channels are assigned to a plurality of mobile stations registered with the base station.

4. The method of claim 2, wherein there are a plurality of base stations and steps a)–f) are performed successively for each of the plurality of base stations.

5. A method of assigning an uplink channel and a downlink channel to a mobile station registered with a base station, comprising the steps of:
   a) turning off pilot tones being transmitted by a plurality of active mobile stations registered with the base station, each turned off pilot tone corresponding to an assigned downlink channel;
   b) turning off pilot tones being transmitted by the base station, each pilot tones corresponding to an uplink channel assigned to one of the plurality of active mobile stations registered with the base station;
   c) paging the mobile station with a pending traffic packet from the base station;
   d) requesting access from the mobile station for a traffic packet;
   e) performing interference sensing at the base station to identify interference-free downlink channels;
   f) performing interference sensing at the plurality of active mobile stations to identify interference-free uplink channels;
   g) transmitting from each one of the plurality of active mobile stations a list of uplink channels identified as being acceptably interference-free;
   h) assigning, at the base station, a downlink traffic channel to the mobile station to receive the pending packets;
   i) assigning, at the base station, an uplink channel to the mobile station; and
   j) transmitting the downlink channel assignment and the uplink channel assignment from the base station to the mobile station.

6. The method of claim 5, wherein downlink channels and uplink channels are assigned to a plurality of mobile stations registered with the base station.

7. The method of claim 5, wherein there are a plurality of base stations and steps a)–j) are performed successively for each of the plurality of base stations.

8. A system for assigning an uplink channel to a mobile station registered with a base station, comprising:
   means for turning off pilot tones being transmitted by the base station, each pilot tones corresponding to an uplink channel assigned to one of a plurality of active mobile stations registered with the base station;
   means for requesting access from the mobile station for a traffic packet;
   means for performing interference sensing at the plurality of active mobile stations to identify interference-free uplink channels;
   means for transmitting from each one of the plurality of active mobile stations a list of uplink channels identified as being acceptably interference-free;
   means for assigning, at the base station, an uplink channel to the mobile station; and
   means for transmitting the uplink channel assignment from the base station to the mobile station.

9. The system of claim 8, wherein downlink channels are assigned to a plurality of mobile stations registered with the base station.

10. The system of claim 8, wherein there are a plurality of base stations and the system operates on each of the plurality of base stations.

11. A system for assigning an uplink channel and a downlink channel to a mobile station registered with a base station, comprising:
    means for turning off pilot tones being transmitted by a plurality of active mobile stations registered with the base station, each turned off pilot tone corresponding to an assigned downlink channel;
    means for turning off pilot tones being transmitted by the base station, each pilot tones corresponding to an uplink channel assigned to one of the plurality of active mobile stations registered with the base station;
    means for paging the mobile station with a pending traffic packet from the base station;
    means for requesting access from the mobile station for a traffic packet;
    means for performing interference sensing at the base station to identify interference-free downlink channels;
    means for performing interference sensing at the plurality of active mobile stations to identify interference-free uplink channels;
    means for transmitting from each one of the plurality of active mobile stations a list of uplink channels identified as being acceptably interference-free;
    means for assigning, at the base station, a downlink traffic channel to the mobile station to receive the pending packets;
    means for assigning, at the base station, an uplink channel to the mobile station; and
    means for transmitting the downlink channel assignment and the uplink channel assignment from the base station to the mobile station.

12. The system of claim 11, wherein downlink channels and uplink channels are assigned to a plurality of mobile stations registered with the base station.

13. The system of claim 11, wherein there are a plurality of base stations and the system operates on each of the plurality of base stations.

14. A computer program product for assigning a downlink channel to a mobile station registered with a base station, comprising:

a computer readable medium;

computer program instructions, recorded on the computer readable medium, executable by a processor, for performing the steps of:

a) turning off pilot tones being transmitted by a plurality of active mobile stations registered with the base station, each turned off pilot tone corresponding to an assigned downlink channel;

b) paging the mobile station with a pending traffic packet from the base station;

c) performing interference sensing at the base station to identify interference-free downlink channels;

d) assigning, at the base station, a downlink traffic channel to the mobile station to receive the pending packets;

e) transmitting the downlink channel assignment from the base station to the mobile station; and wherein there are a plurality of base stations and steps a)–e) are performed successively for each of the plurality of base stations.

15. A computer program product for assigning a uplink channel to a mobile station registered with a base station, comprising:

a computer readable medium;

computer program instructions, recorded on the computer readable medium, executable by a processor, for performing the steps of:

a) turning off pilot tones being transmitted by the base station, each pilot tones corresponding to an uplink channel assigned to one of a plurality of active mobile stations registered with the base station;

b) requesting access from the mobile station for a traffic packet;

c) performing interference sensing at the plurality of active mobile stations to identify interference-free uplink channels;

d) transmitting from each one of the plurality of active mobile stations a list of uplink channels identified as being acceptably interference-free;

e) assigning, at the base station, an uplink channel to the mobile station; and f) transmitting the uplink channel assignment from the base station to the mobile station.

16. The computer program product of claim 15, wherein downlink channels are assigned to a plurality of mobile stations registered with the base station.

17. The computer program product of claim 15, wherein there are a plurality of base stations and steps a)–f) are performed successively for each of the plurality of base stations.

18. A computer program product for assigning an uplink channel and a downlink channel to a mobile station registered with a base station, comprising:

a computer readable medium;

computer program instructions, recorded on the computer readable medium, executable by a processor, for performing the steps of:

a) turning off pilot tones being transmitted by a plurality of active mobile stations registered with the base station, each turned off pilot tone corresponding to an assigned downlink channel;

b) turning off pilot tones being transmitted by the base station, each pilot tones corresponding to an uplink channel assigned to one of the plurality of active mobile stations registered with the base station;

c) paging the mobile station with a pending traffic packet from the base station;

d) requesting access from the mobile station for a traffic packet;

e) performing interference sensing at the base station to identify interference-free downlink channels;

f) performing interference sensing at the plurality of active mobile stations to identify interference-free uplink channels;

g) transmitting from each one of the plurality of active mobile stations a list of uplink channels identified as being acceptably interference-free;

h) assigning, at the base station, a downlink traffic channel to the mobile station to receive the pending packets;

i) assigning, at the base station, an uplink channel to the mobile station; and j) transmitting the downlink channel assignment and the uplink channel assignment from the base station to the mobile station.

19. The computer program product of claim 18, wherein downlink channels and uplink channels are assigned to a plurality of mobile stations registered with the base station.

20. The computer program product of claim 18, wherein there are a plurality of base stations and steps a)–j) are performed successively for each of the plurality of base stations.

21. A method for medium access control for uncoupled downlink and uplink channel assignment, comprising:

assigning a base station a frame within a periodic super-frame during which it transmits;

transmitting narrow-band pilot tones from the base station, corresponding to assigned traffic channels between base station and their mobiles;

scanning the tones from the base station by mobiles and reporting a list of channels with low interference back to the base station;

said scanning being in a staggered order to avoid contention for a same channel between mutually interfering base stations with concurrent traffic; and selecting at the base station a channel and notifying the mobile.

22. A system for medium access control for uncoupled downlink and uplink channel assignment, comprising:

a base station having an assigned frame within a periodic super-frame during which it transmits;

said base station transmitting narrow-band pilot tones, corresponding to assigned traffic channels between the base station and mobile stations;

a mobile station scanning the tones from the base station by mobiles and reporting a list of channels with low interference back to the base station;

said scanning being in a staggered order to avoid contention for a same channel between mutually interfering base stations with concurrent traffic; and said base station selecting a channel and notifying the mobile.

* * * * *